US007560847B2

(12) United States Patent
Hsu

(10) Patent No.: US 7,560,847 B2
(45) Date of Patent: Jul. 14, 2009

(54) TWO-STAGE EUTECTIC METAL BRUSHES

(75) Inventor: John S Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 372 days.

(21) Appl. No.: 11/463,994

(22) Filed: Aug. 11, 2006

(65) Prior Publication Data

US 2007/0152533 A1 Jul. 5, 2007

Related U.S. Application Data

(60) Provisional application No. 60/756,236, filed on Jan. 4, 2006.

(51) Int. Cl.
*H02K 13/00* (2006.01)

(52) U.S. Cl. ....................................... 310/219; 310/248

(58) Field of Classification Search ................. 310/219, 310/178, 231, 232, 243, 248–251
See application file for complete search history.

(56) References Cited

U.S. PATENT DOCUMENTS 2,588,466 A 3/1952 Barnes
4,168,446 A * 9/1979 Hatch ......................... 310/219
4,628,221 A 12/1986 Young

FOREIGN PATENT DOCUMENTS

EP 0347089 A1 6/1989
GB 2203293 B1 4/1987

* cited by examiner

*Primary Examiner*—Dang D Le
(74) *Attorney, Agent, or Firm*—Luedeka, Neely & Graham, P.C.

(57) ABSTRACT

A two-stage eutectic metal brush assembly having a slip ring rigidly coupled to a shaft, the slip ring being electrically coupled to first voltage polarity. At least one brush is rigidly coupled to a second ring and slidingly engaged to the slip ring. Eutectic metal at least partially fills an annulus between the second ring and a stationary ring. At least one conductor is rigidly coupled to the stationary ring and electrically coupled to a second voltage polarity. Electrical continuity is maintained between the first voltage polarity and the second voltage polarity. Periodic rotational motion is present between the stationary ring and the second ring. Periodic rotational motion is also present between the brush and the slip ring.

10 Claims, 1 Drawing Sheet

TWO-STAGE EUTECTIC METAL BRUSHES

CROSS-REFERENCE TO RELATED APPLICATIONS

This application claims priority to U.S. Provisional Patent Application 60/756,236 filed Jan. 4, 2006, and is herein incorporated by reference.

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

BACKGROUND OF THE INVENTION

In machines such as homopolar motors utilizing high armature current at low voltage, high current-carrying capacity is required for making electrical connections between the rotor and the stator. It is well known in the art to utilize liquid metal current collectors for such machines due to the high current-density capacity of such collectors, for example, 3,000 to 10,000 amperes per square inch, by the liquid metal as compared to approximately one-tenth of this current density in the case of conventional solid carbon brushes. Further, solid brushes exhibit an order of magnitude higher voltage drop than that of liquid metal brushes, even at the lower current density. As a result of this higher voltage drop, solid brushes generate more heat than liquid metal brushes and wear both the brushes and the slip rings down rapidly. To provide the high current carrying capacity required by homopolar motors, a large number of solid brushes are necessary. The current is not necessarily shared equally by all of the brushes resulting in unequal heating and wear of the brushes. Moreover, a failure of one brush allowing debris to be transported around the slip ring may result in catastrophic failure of all the brushes.

In high current, high speed operation of homopolar machines, it has been common practice to provide a constant supply of liquid metal by pumping it to the stator and rotor current collector sites. This ensures that the current collectors are continuously wetted.

U.S. Pat. No. 4,628,221 to Young discloses a homopolar motor with pressurized liquid metal contact. The invention of Young uses a rotor having a circular cylindrical shell utilized as a conductor ring, a stator current collector ring of one polarity encircling one edge of the rotor conductor ring and another stator current collector ring of the opposite polarity encircling the other edge of the rotor conductor ring. Liquid metal is utilized within the cylindrical enclosure to provide continuous electrical contact between the stator current collector and the rotor ring.

U.S. Pat. No. 2,588,466 to Barnes discloses a unipolar or homopolar generator using a sodium/potassium alloy as a liquid brushes. Structure adapted to employ liquid brushes is also disclosed.

Great Britain Patent Application No. 2,203,293 to Parson discloses a homopolar generator comprising a rotor having an armature of conductive, ferromagnetic material. The rotor being surrounded by a ferromagnetic stator, field coils being provided on the stator, the field coils being connected to an alternating current supply to provide an alternative magnetic field.

European Patent Application No. 0,347,089 discloses a homopolar device along the line of the above GB '293 application with the exception that it utilizes first and second annular elements having conductive and non-conductive sectors. Formation of annular electrical currents is thus avoided.

BRIEF SUMMARY OF THE INVENTION

A two-stage eutectic metal brush assembly having a slip ring rigidly coupled to a shaft, the slip ring being electrically coupled to first voltage polarity. At least one brush is rigidly coupled to a second ring and slidingly engaged to the slip ring. Eutectic metal at least partially fills an annulus between the second ring and a stationary ring. At least one conductor is rigidly coupled to the stationary ring and electrically coupled to a second voltage polarity. Electrical continuity is maintained between the first voltage polarity and the second voltage polarity. Periodic rotational motion is present between the stationary ring and the second ring. Periodic rotational motion is also present between the brush and the slip ring.

DETAILED DESCRIPTION OF THE INVENTION

Figure 1:
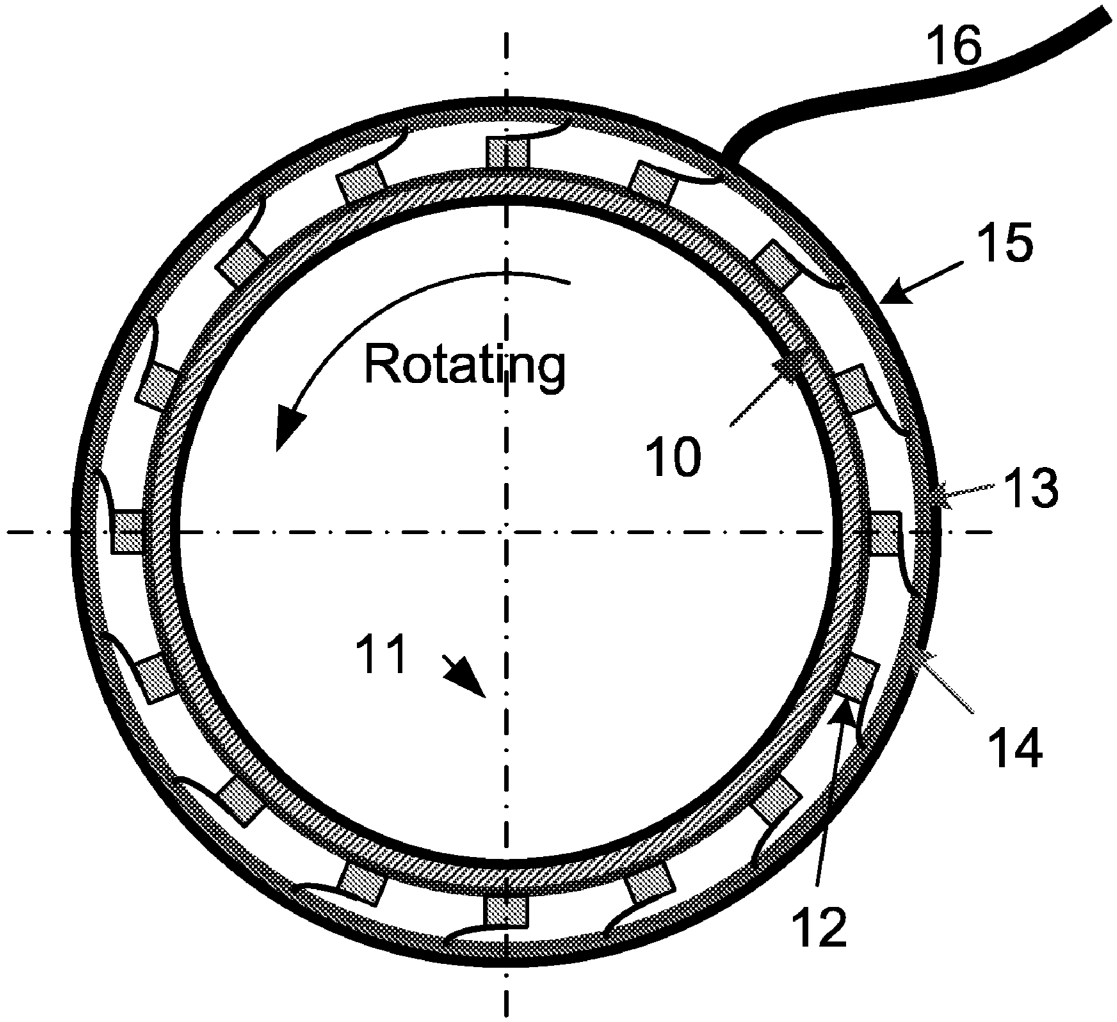
FIG. 1 is a diagram of the two-stage eutectic metal brushes components.

For rotating electrical machines, when mentioning slip rings and brushes, maintenance and low-life-expectancy problems are feared. Brushes do cause wear and tear problems on both the brushes and slip rings. Therefore, brushless electrical machines currently become the only choice for critical motor drives.

However, the brush-type machines, such as the homopolar machine, offer unique advantages over the conventional brushless machines. The homopolar machine does not require an inverter for commutation. This decreases the cost significantly. Furthermore, the electromagnetic interference (EMI) is eliminated. The homopolar machine is most suitable for low-voltage and high-current operation. This matches the fuel-cell characteristics extremely well. Liquid-metal brushes can be a solution to overcome the maintenance and life-expectancy problem of the traditional solid-brush-type machines. The terms liquid metal and eutectic metal are used interchangeably herein.

Solid state brushes, such as graphite and graphite composites are commonly used in motors and generators requiring high current density. Metals such as silver, copper and gold also may be used to make electrical contact brushes.

Eutectic metal electrical contact compositions that are particularly useful for high current density applications of this invention include liquid metals or alloys having low melting points, low densities, high thermal stability, high physical stability, high ability to wet the current collector surfaces in machinery in which they are used, low reactivity with oxygen, and low toxicity. In homopolar motors or generators, the rotational forces are such that a sufficiently dense eutectic metal is required to retain the alloy in motor channels. High alloy stability, under the rotational forces involved, is also a valued characteristic.

Environmentally friendly eutectic metals of the invention include; 1) Galinstan is a eutectic alloy of 68.5% gallium, 21.5% indium, and 10% tin. At sea-level pressure it is liquid at room temperature, typically freezing at (minus) −20° C. (−4° F.). Its physical properties are: boiling point greater than 1300° C., melting point (minus) −19° C., vapor pressure at 500° C. less than 10 Torr, density 6.44 g/cm$^3$, and insoluble in water or organic solvents; 2) Various indium alloys, for example, an alloy of 24% indium and 76% gallium is liquid at room temperature.

Other examples of eutectic metal compositions are mercury, gallium alloys, and a liquid metal eutectic of sodium and potassium containing 78 percent potassium and 22 weight percent sodium (NaK-78). Fusible alloys, such as the binary, ternary, quaternary, and quinternary mixtures of bismuth, lead, tin, cadmium, and indium, are well known in the alloy art for applications where low melting point is a desired property. Examples include Rose's Alloy (Bi 50 weight %, Pb 28 weight %, Sn 22 weight %), and Wood's Metal (Bi 50 weight %, Pb 25 weight %, Sn 12.5 weight %, Cd 12.5 weight %). These alloys have definite and minimum melting points, as compared with other compositions of the same metals, which are also well known in the alloy art. Other eutectic metal electrical contact compositions examples of this invention consist of a metal mixture of first and second Periodic Table Group III metals and a lubricant such as a gallium/indium metal mixture. Preferred lubricants are metal-based, most preferably molybdenum-based.

New low-temperature eutectic metals will be developed in the future. However, even the eutectic metal with a melting point of (minus) −19° C. cannot maintain its liquid form during the cold winters of Alaska. The Two-Stage Eutectic Metal Brushes technology of this invention overcomes this temperature problem by using both eutectic metals and solid metal brushes as conductors.

FIG. 1 shows the principle of the Two-Stage Eutectic Metal Brushes technology. The slip ring 10 mounted on the shaft 11 is electrically connected to one polarity of the voltage. This rotating slip ring 10 is in contact with the brushes 12 that are mounted inside of a second ring 13. The brushes 12 are spring loaded to ensure a good contact with the slip ring 10 as well as to produce a certain friction between the slip ring 10 and the spring loaded brushes 12. The eutectic metal 14 rides on the outer surface of the second ring 13. A stationary ring 15 is used to collect the electrical current from the eutectic metal 14. The conductor 16 is connected to the stationary ring 15. The seal and the reservoir for the eutectic metal are part of the common-sense structure and are not shown in this figure. The name "two stage" comes from the fact that the current goes through both spring load brushes 12 and eutectic metal 14 brush for meeting all temperature situations.

During normal operation, due to the friction between the spring loaded brushes 12 and the slip ring 10, the liquid eutectic metal 14 is the primary brush to convey the current from the slip ring 10 via the rotating spring loaded brushes 12, to the second ring 13. The current then goes through the liquid eutectic metal 14 to the stationary ring 15 and heads towards the conductor 16.

When the temperature is extremely cold, the eutectic metal 14 turns into solid. The primary brushes then become the spring loaded brushes 12 riding on the slip ring 10. This situation will not take significant time, because the frictional and electrical losses of the slip ring 10 and spring loaded brushes 12 heat up the solid eutectic metal 14 locally and change it to a liquid form in a short time. The relative motion between the slip ring 10 and the spring loaded brushes 12 will stop due to the friction. Consequently, the liquid eutectic metal 14 becomes the primary brushes again.

The life expectancies of the spring loaded brushes 12 and slip ring 10 are significantly prolonged due to less wear and tear between the slip ring 10 and the spring loaded brushes 12. The slip ring 10 is electrically conducting and corrosion resistant to the eutectic metal 14. Hence, traditional problems with the brushless-type machines are solved.

Various alternative designs can be developed based on the principle of two-stage liquid-metal brushes described above. While there has been shown and described what are at present considered the preferred embodiments of the invention, it will be obvious to those skilled in the art that various changes and modifications can be made therein without departing from the scope.

I claim:

1. A two-stage eutectic-metal brush assembly comprising;

a first slip ring coupled to a shaft, said first slip ring electrically coupled to first voltage polarity, at least one brush coupled to a second slip ring and slidingly engaged to said first slip ring, a stationary ring disposed around the second slip ring forming an annulus between the stationary ring and the second slip ring, eutectic metal at least partially filling the annulus between said second slip ring and the stationary ring, for conducting electricity between the second slip ring and the stationary ring when the eutectic metal is in either a solid state or a liquid state, for allowing the second slip ring to rotate relative to the stationary ring when the eutectic metal is liquid and for holding the second slip ring stationary when the eutectic metal is solid, at least one conductor rigidly coupled to said stationary ring and electrically coupled to a second voltage polarity, wherein electrical continuity is maintained between said first voltage polarity and said second voltage polarity, wherein the stationary ring and the second slip ring are configured to provide first periodic rotational motion between said stationary ring and said second slip ring when the shaft is rotating and the eutectic metal is in a liquid state, and wherein the first slip ring and the second slip ring are configured to provide second periodic rotational motion between said at least one brush and said slip ring when the shaft is rotating and the eutectic metal is in a solid state.

2. The assembly of claim 1 wherein said at least one brush further comprises spring loading.

3. The assembly of claim I wherein said at least one brush is selected from the group consisting of graphite, graphite composites, copper, silver and gold.

4. The assembly of claim 1 wherein said first slip ring is electrically conducting and corrosion resistant to said eutectic metal.

5. The assembly of claim 4 wherein said eutectic metal further comprises a lubricant.

6. The assembly of claim 1 wherein said eutectic metal is selected from the group consisting of galinstan, indium, gallium, mercury, sodium, potassium, bismuth, lead, tin, cadmium, and mixtures thereof.

7. The assembly of claim 6 wherein said lubricant is metal-based.

8. A two-stage eutectic-metal brush assembly comprising;

a first slip ring coupled to a shaft, said first slip ring electrically coupled to first voltage polarity, said first slip ring having an exterior cylindrical surface, a second slip ring disposed concentrically around said first slip ring and being spaced apart from the first slip ring to form an annular space between said first and second slip rings, at least one brush disposed in the annular space between said first and second slip rings and being coupled to the second slip ring and slidingly engaging the exterior cylindrical surface of said first slip ring, a stationary ring disposed concentrically around said second slip ring and being spaced apart from said second slip ring to form an annulus between the second slip ring and the stationary ring, eutectic metal at least partially filling the annulus between said second slip ring and) the stationary ring, at least one conductor coupled to said stationary ring and electrically coupled to a second voltage polarity, wherein electrical continuity is maintained between said first voltage polarity and said second voltage polarity, and wherein rotational motion is present between said stationary ring and said second ring when the shaft is rotating and the eutectic metal is in a liquid state, and rotational motion is present between said at least one brush and said first slip ring when the shaft is rotating and the eutectic metal is in a solid state.

9. The assembly of claim 8 wherein a plurality of brushes are disposed in the space between the first and second slip rings, each brush being spring biased against the exterior cylindrical surface of the first slip ring and slidingly engaging the first slip ring.

10. The assembly of claim 8 wherein the at least one brush is located proximate to the eutectic metal and is configured to slide against the exterior cylindrical surface of the first slip ring when the eutectic metal is solid, produce heat, and transfer heat to the eutectic metal for melting the eutectic metal.

* * * * *